United States Patent
Hermansson et al.

[15] 3,699,425
[45] Oct. 17, 1972

[54] CONVERTER CONNECTIONS

[72] Inventors: Bo Hermansson; Kjeld Thorborg, both of Vasteras, Sweden

[73] Assignee: Allmanna Svenska Elektriska Aktiebolaget, Vasteras, Sweden

[22] Filed: May 7, 1971

[21] Appl. No.: 141,173

[30] Foreign Application Priority Data

May 28, 1970 Sweden ......................7335/70

[52] U.S. Cl............321/27 R, 321/27 MS, 321/45 R, 323/101, 323/123
[51] Int. Cl. .........................................H02m, G05f
[58] Field of Search..........321/5, 27 R, 27 MS, 45 R; 219/10.77, 10.79; 323/101, 109, 123, 127

[56] References Cited

UNITED STATES PATENTS

| | | | |
|---|---|---|---|
| 3,328,596 | 6/1967 | Germann et al. | 321/45 R |
| 3,566,148 | 2/1971 | Wood | 321/45 R |
| 3,551,799 | 12/1970 | Koppelmann | 323/127 X |
| 3,558,915 | 1/1971 | Wood et al. | 321/45 R |
| 2,341,280 | 2/1944 | Ludbrook | 323/109 |

FOREIGN PATENTS OR APPLICATIONS 996,587   6/1965   Great Britain...........321/45 R

*Primary Examiner*—William H. Beha, Jr.
*Attorney*—Jennings Bailey, Jr.

[57] ABSTRACT

A single or multiphase converter connection includes a controlled first converter having an AC side and a DC side. A first reactor connects the DC side to a DC source. A capacitor is connected to the AC side of the first converter. A controlled current circuit is formed of a second reactor and controlled rectifiers connected to the second reactor to control the current therethrough. A control means is provided for firing said rectifiers with an adjustable delay angle so that the current circuit generates a variable capacitive current.

7 Claims, 6 Drawing Figures

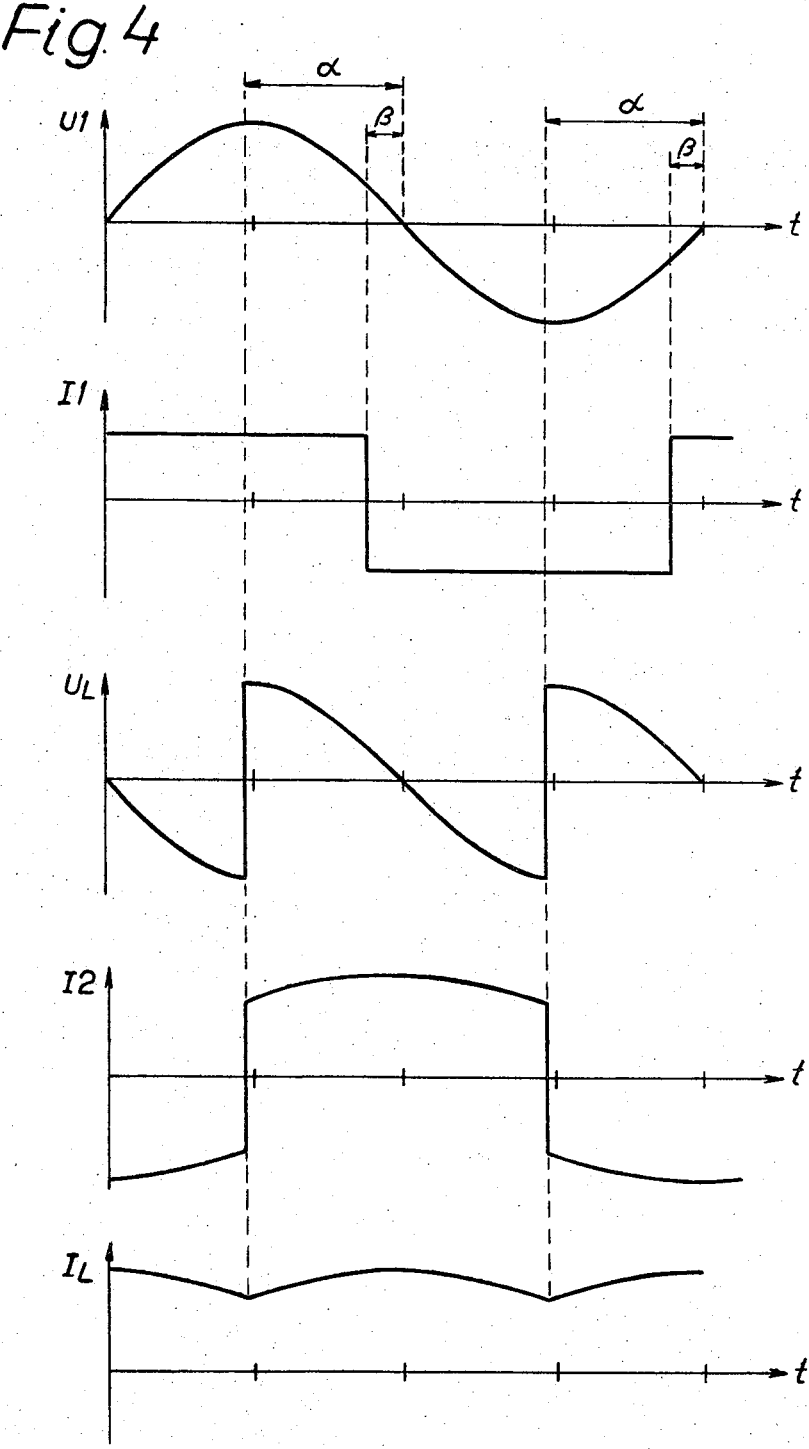

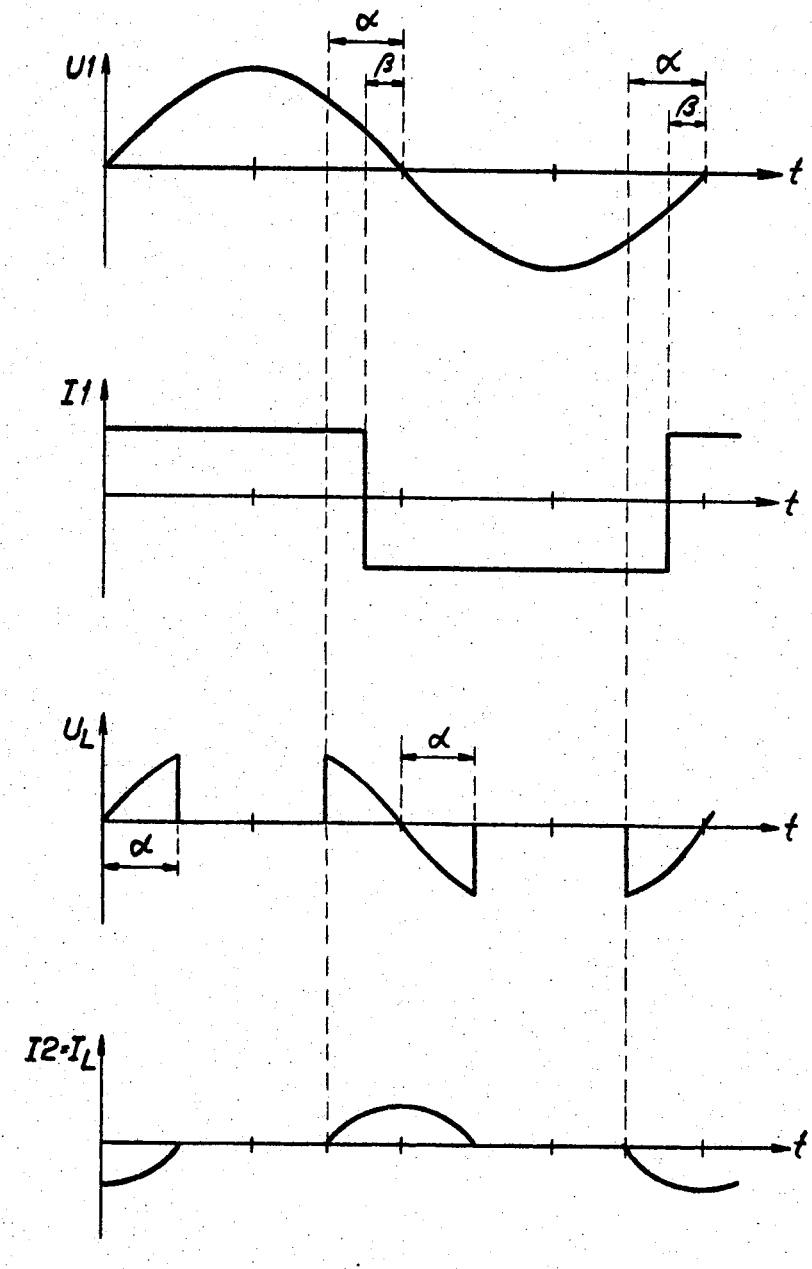

CONVERTER CONNECTIONS

Prior art converter connections are well known and some thereof are especially useful for inductive loads, for example for feeding induction furnaces. The load in this case is connected in parallel with a capacitor bank dimensioned so that the parallel oscillating circuit acquires the desired frequency. The converter operates as an inverter and feeds alternating voltage energy to the load. The frequency of the load voltage will therefore be substantially equal to that of the parallel oscillating circuit. The oscillating circuit operates as a commutating alternating voltage source. By making the control angle of the converter rectifiers variable in relation to the load voltage, the amplitude of the latter voltage can be made controllable.

However, if the frequency should be variable, this can only be effected by making the reactances of the oscillating circuit elements variable, for example by connecting different numbers of capacitors in the capacitor bank. Thus for practical and economical reasons which can easily be understood, frequency control is only possible in few and large steps.

SUMMARY OF THE INVENTION

However, with a converter connection according to the invention stepless control of the frequency is easily obtained over a large range as well as the possibility of accurately guiding or regulating the frequency to the desired value. At the same time voltage control is retained. A converter connection according to the invention includes a controlled first converter having an AC side and a DC side, a first reactor connecting its DC side to a DC source, a capacitor connected to the AC side of the first converter, a controlled current circuit formed of a second reactor and controlled rectifiers connected to the second reactor to control the current therethrough and a control means for firing said rectifiers with an adjustable delay angle so that the current circuit generates a variable capacitive current.

BRIEF DESCRIPTION OF THE DRAWINGS

The invention will be further described with reference to the accompanying drawings.

FIG. 4 shows curve shapes of the most important magnitudes for the device according to FIG. 1, and FIG. 5 the same thing for the alternative embodiment according to FIG. 2.

DESCRIPTION OF THE PREFERRED EMBODIMENTS

Figure 1:
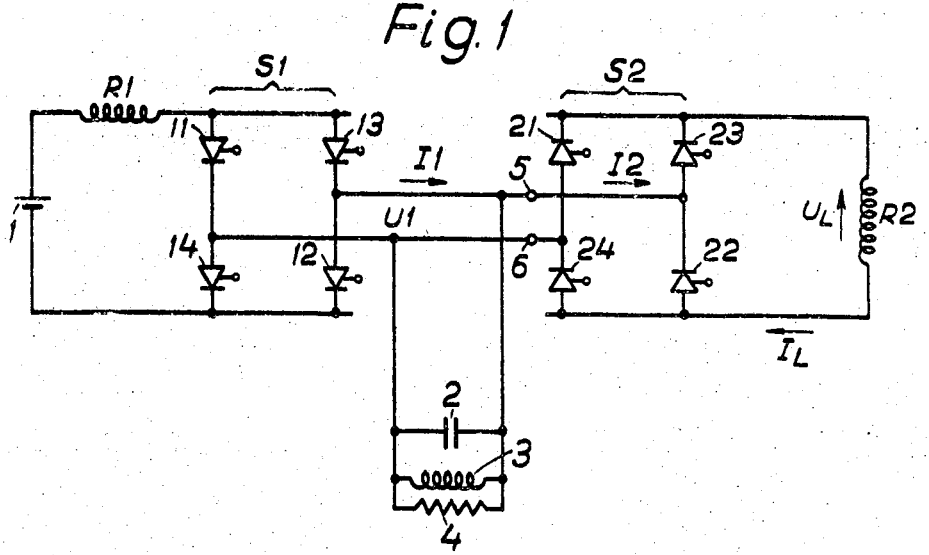
FIG. 1 shows an example of a converter connection according to the invention.

In FIG. 1 the converter S1 is fed over the smoothing reactor R1 (which is large enough for the direct current to be continuous) from a direct voltage source 1 consisting, for example of an accumulator battery or a diode or thyristor rectifier fed from an alternating voltage network. The converter consists of the four thyristors 11-14 which are arranged to be conventionally fired in pairs (11, 12 and 13, 14) and alternately by a control pulse device not shown in the drawing. The firing is arranged to take place with a delay in relation to the voltage on the alternating voltage side of the converter of between 90° and 180°. The converter therefore operates as an inverter and supplies energy from its direct to its alternating voltage side. To the latter a parallel circuit is connected comprising a capacitor 2 and a reactor 3 as well as a resistor 4 which indicates the equivalent resistance of the load object fed by the converter. The load object may be inductive, in which case it is connected in parallel with the capacitor 2 as shown. If the load object is purely resistive the inductance of the reactor R2 can be used for the oscillating circuit and no special reactor 3 need then be used. The converter may of course also be used to supply an alternating voltage network, for example in an emergency current unit.

A controlled current circuit having connection terminals 5, 6 is also connected to the alternating voltage output of the converter. This consists of a second converter S2 with thyristors 21-24 and the reactor R2, connected to the direct voltage side of the converter S2. The thyristors are controlled by a control pulse device, not shown, in conventional manner so that a variable direct voltage is obtained over the reactor. If the circuit (reactor + thyristors) were to be loss free, the ignition delay of the thyristors would always be exactly 90°, which would give the direct voltage the value zero and a finite current through the reactor. However, the circuit always has certain losses. The ignition delay must therefore be slightly less than 90° for a current to flow and by varying the ignition delay the magnitude of the reactor current can be adjusted. The current taken out from the AC side is thus nearly 90° phase-displaced after the alternating voltage and is thus almost a purely inductive current. The controlled current circuit S2, R2 thus functions as a consumer of a variable inductive current or, which is the same thing, it generates a variable capacitive current.

By decreasing the ignition delay in S2 from 90° the current in R2 is increased and the inductive load current to the circuit thus also increases. In order to maintain the balance between inductive and capacitive current in the circuit, the capacitive current must also increase and this is done because the frequency of the load voltage increases. This frequency can thus easily be controlled substantially without losses within wide ranges by controlling the ignition delay of the converter S2.

Figure 2:
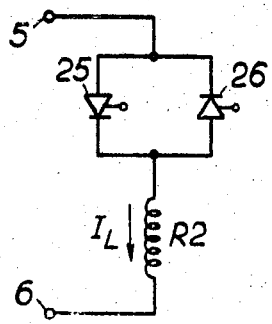
FIGS. 2 and 3 show alternative embodiments of the controlled current circuit.

FIG. 2 shows another embodiment of the controlled current circuit. The reactor R2 is here connected in series with the anti-parallel connected thyristors 25, 26 and an (inductive) alternating current flows through it, the magnitude of which can be varied by regulating the thyristors.

Figure 3:
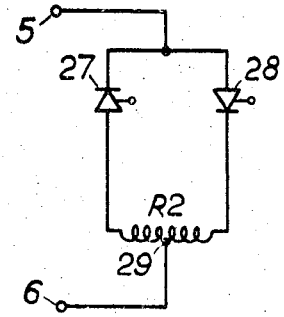

FIG. 3 shows an embodiment in which the reactor R2 is provided with a central tap 29 connected to one connection terminal 6 of the circuit. The free ends of the reactor are connected through the oppositely directed thyristors 27, 28 to the second connection terminal 5 of the circuit. The function of the circuit is principally the same as that of the circuit shown in FIG. 1.

FIG. 4 shows the load voltage (U1), the alternating current (I1) from the converter S1, the voltage ($U_L$) over the reactor R2, the alternating current (I2) of the converter S2 and the reactor current ($I_L$) in the circuit according to FIG. 1. The reference directions are clear from FIG. 1. As can be seen from I1, the ignition of the thyristors in S1 takes place at an angle $\beta$ before each passage of the alternating voltage U1 through zero. $\beta$ must be so much greater than zero that the commutated thyristors have time to recover before once again receiving reverse blocking voltage. By altering $\beta$ the amplitude of the alternating voltage can be regulated. Since the feeding direct voltage from the source 1 is constant the alternating voltage U1 will be proportional to $1/\cos \beta$, from which it follows that $\beta$ must be less than 90° so that theoretically infinite alternating voltage amplitude will not be obtained. As is clear from $U_L$ the thyristors in S2 are ignited at an angle $\alpha$ before each passage through zero, where $\alpha$ is somewhat greater than 90°. The magnitude of the reactor current $I_L$ and thus, as shown above, the frequency of the alternating voltage are regulated by altering $\alpha$.

FIG. 5 shows the same magnitudes in the embodiment according to FIG. 2. The reactor R2 has an alternating current flowing through it, so that $I2 = I_L$. The angle $\alpha$ can be regulated in this case between 0° and 90°, thus changing $I_L$ between zero and its maximum value and consequently altering the frequency from its minimum to its maximum value.

Figure 6:
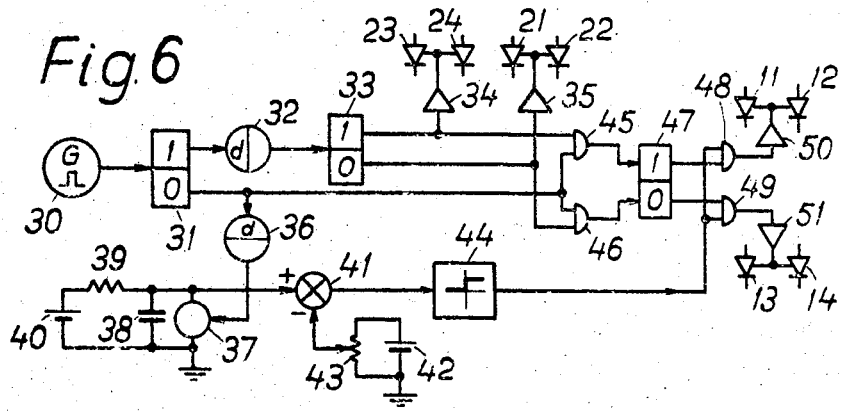
FIG. 6 shows a simple and advantageous embodiment of a control device to control a converter connection according to the invention.

FIG. 6 shows a control pulse device to effect the desired control of the circuit in FIG. 1. Of course, the most obvious thing would be to sense the zero-passages of the alternating voltage U1 and in relation to these zero passages to emit ignition pulses to the thyristors at the moments defined by the angles $\alpha$ and $\beta$. Such a method is relatively complicated and presents certain problems because of the variable frequency. In the control circuit shown in FIG. 6 the need for locking the firing times to the alternating voltage has been eliminated, thus eliminating these problems and considerably simplifying the control pulse device.

A free-running pulse generator 30 delivers pulses having a variable frequency which is four times the desired alternating voltage frequency. The pulses trip a switch 31 alternately to one position and zero position. Thus alternate pulses from the generator, through the differentiating circuit 32, switch the switch 33 so that two thyristors in the converter 32 are ignited over the amplifiers 34 and 35, respectively. The thyristors 23, 24 and the thyristors 21, 22 are ignited alternately. Exactly between each such ignition a pulse is obtained from the zero output of the switch 31 which through the differentiating circuit 36 momentarily closes the electronic contact 37. The capacitor 38 is thus instantaneously discharged, after which until the next discharge it is charged with constant current from the source 40 over the resistor 39. The capacitor voltage, which is thus a saw-tooth voltage, is compared in the comparison device 41 with a variable reference voltage which is obtained from the resistor 43 connected to the source 42. When the capacitor voltage exceeds the reference voltage a pulse is obtained from the level discriminator 44, whereupon one of the two thyristor pairs 11, 12 or 13, 14 in the converter S1 is ignited by the AND-circuits 48, 49 and the amplifiers 50, 51. Which pair shall be ignited is determined by the position of the switch 47 which, as is clear from the drawings, is controlled by the switches 31, 33 and the AND-circuits 45, 46 so that the correct pair of thyristors in S1 is ignited.

The desired frequency of the alternating voltage is thus set by adjusting the frequency of the generator 30. It is then found that the angle $\alpha$, i.e. the phase displacement between the ignition pulses to S2 and the alternating voltage, is automatically adjusted to such a value that the circuit S2, R2 generates exactly the capacitive current required for the frequency in question. The phase difference ($\alpha - \beta$) between the control pulses to S2 and the control pulses to S1 may be altered by altering the reference voltage from the circuit 42, 43 and thus, since with constant frequency $\alpha$ is constant, $\beta$ can be varied and the desired alternating voltage amplitude set.

The control device shown may of course be supplemented by closed regulating systems for voltage or frequency or both and of course alternative or similar known control devices according to the above principles may be used.

The converter connection according to the invention is described and shown in a single phase embodiment. However, it can also be applied to multiphase converters. In the alternative according to FIG. 1 the converters S1 and S2 are in that case replaced by, for example three-phase converters. In the alternative according to FIGS. 2 and 3 circuits in accordance with these figures in, for example, three-phase arrangement, are connected between each pair of phase conductors of S1 (triangle connection) or between each phase conductor and an artificial zero point (star connection).

I claim:

1. A self-commutated inverter comprising a controlled first converter connection, comprising controlled rectifiers, a DC source, said converter connection having an AC side, a first reactor connecting the DC side of the first converter connection to the DC source, a capacitor connected to the AC side, a variable inductance connection connected to said AC side and comprising a second reactor and controlled rectifiers connected to the second reactor to control the current therethrough, a control pulse means connected to said first converter connection and to said variable inductance connection and comprising a free-running oscillator which is arranged to supply a first pulse train to said first converter connection, to ignite the controlled rectifiers thereof, said pulse train having a frequency corresponding to the frequency of the oscillator and to the desired inverter output frequency, said control pulse means being arranged to supply a second pulse train to the variable inductance connection for ignition of the controlled rectifiers thereof, said second pulse train having a frequency equal to that of said first pulse train, corresponding pulses of said first and second pulse trains being phase displaced in relation to each other.

2. A self-commutated inverter according to claim 1, said variable inductance connection comprising an anti-parallel connection of two controlled rectifiers connected in series with the second reactor.

3. A self-commutated inverter according to claim 1, in which the second reactor is provided with a central tap which is joined to a first connection terminal of said variable inductance connection, and two oppositely directed controlled rectifiers connecting both ends of the reactor to a second connection terminal of the variable inductance connection.

4. A self-commutated inverter according to claim 1, in which the converter connection is n-phase and its AC side is provided with n-phase outputs, and having n identical variable inductance connections connected to the phase outputs.

5. A self-commutated inverter according to claim 4, in which the variable inductance connections are connected between each pair of phase outputs.

6. A self-commutated inverter according to claim 4, in which the variable inductance connections are connected between each phase output and an artificial zero point.

7. A self-commutated inverter according to claim 1, in which the variable inductance connection comprises a second controlled converter connection, the AC side of which is connected to the AC side of the first converter connection, said second reactor being connected between the DC terminals of said second controlled converter connection.

* * * * *